Patented May 26, 1953

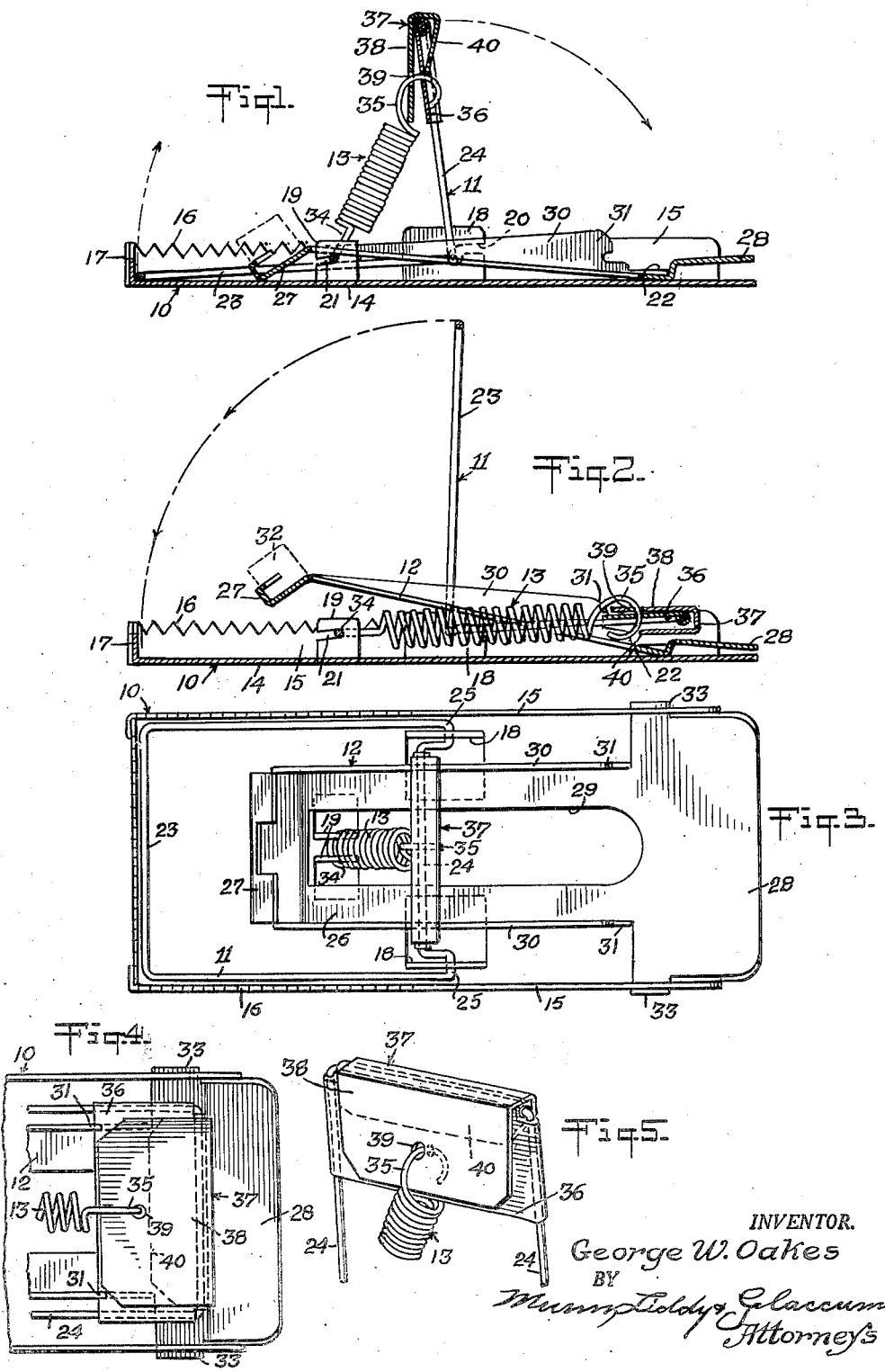

2,639,539

UNITED STATES PATENT OFFICE 2,639,539

TRAP

George W. Oakes, Crystal City, Mo.

Application February 8, 1950, Serial No. 143,035

2 Claims. (Cl. 43—83.5)

This invention relates to an animal trap and has especial reference to the type of trap disclosed in my copending application, Serial No. 92,705, filed May 11, 1949, now Patent No. 2,577,354, patented on December 4, 1951.

The principal object of the present invention is the addition of special means to a trap of the type mentioned which enables a person to set the trap by the mere act of moving the spring actuated pivoted jaw into its open position; and said means requiring only slight effort by a mouse to spring the trap.

A preferred embodiment of the improvement is illustrated in the accompanying drawing, in which:

Fig. 1 is a central longitudinal sectional view of a trap embodying the features of the present invention, the trap being shown sprung;

Fig. 2 is a view similar to Fig. 1 but showing the trap set;

Fig. 3 is a top plan view of the trap sprung;

Fig. 4 is a fragmentary plan view showing the trap setting parts in the set relation; and Fig. 5 is a fragmentary perspective of parts of the trap setting means.

The trap described in the above identified Patent comprises four main parts 10, 11, 12 and 13 as follows:

The part 10 in the nature of a base consists of a plate 14 having an upstanding marginal flange 15 extending all around the plate except at the rear end. The flange 15 is serrated at the front end of the plate and partly around the sides to provide teeth on the flange constituting a fixed jaw 17. Pairs of lugs are upstruck from the plate 14, there being a pair of lugs 18 and a pair of lugs 19. The lugs 18 have notches 20 therein and the lugs 19 have notches 21 therein. By notching the lugs in the manner shown they serve as hooks. The flange 15 has slots 22 therein at opposite sides of the plate 14. The slots 22 are in transverse alinement with respect to the longitudinal axis of the plate 14.

The part 11 consists of a single piece of stout wire bent to provide a loop 23 and a trigger setting loop 24 in continuation of the loop 23, as a single element of L shape. The loop 23 constitutes a jaw, and the loop 24 constitutes manipulatable means for setting the jaw 23. The wire is bent into offsets at the juncture of the loops to provide pivots 25 in axial alinement with each other. The pivots 25 are receivable in the notches 20 respectively thereby mounting the part or element 11 and therefore the loops 23 and 24 for pivotal movement with respect to the plate 14. By reason of the pivotal movement of the element 11, the jaw 23 is movable into an open and closed position with respect to the fixed jaw 17.

The part 12 is in the nature of a trigger and bait holder and is constructed from a single piece of sheet metal to provide an elongated portion 26, a rebent notched front end portion 27, and a relatively wide rear end portion 28. The portion 26 has an opening 29 therein and upstanding side flanges 30 with notches to provide projections 31. The portion 27 provides hooks or the like constituting bait holding means. Bait is indicated at 32 in Fig. 2. The portion 27 slants forwardly and downwardly with respect to the portion 26, and constitutes a trigger actuator. The portion 28 has lateral projections 33 receivable in the slots 22 to prevent endwise movement of the part 12 with respect to the plate 14 on which it rests. The portion 28 slants rearwardly and upwardly with respect to the portion 26 making it possible for the part 12 to rock on the plate 14 so that the projections 31 have a certain amount of arcuate movement as the part 12 is rocked on the plate 14. The slots 22 are large enough to allow the part 12 to rock without interference from the projections 33.

The part 13 consists of a contractile helical spring which has one end connected with the lugs 19, as at 34, and its opposite end in the form of an eye 35 is connected with the loop 24 by means of a piece 36 of sheet metal secured to the loop 24 crosswise thereof in any suitable manner. The opening 29 accommodates the spring 13 and lugs 19. In the present instance the piece 36 has its opposite side and rear edge portions wrapped around portions of the loop 24. The piece 36 thus secured constitutes a catch which cooperates with the projections 31 for setting the trap. The eye 35 is received in a hole in the catch piece 36. The spring 13 is placed under tension when the jaw 23 is in its open position, and the spring reacts forcefully to snap the jaw 23 into its closed position when released from its open position as indicated by the arrows in Fig. 2.

In accordance with the present improvement, the catch piece 36 has applied thereto a manipulating member 37 for setting the trap. The member 37 is made of sheet metal which is cut and bent to provide a small flat plate 38 with a hole 39 and a downwardly and forwardly extending transverse edge portion 40 integral with the plate 38. The member 37 is substantially J shape in cross-section. The eye 35 is engaged in the hole 39 connecting the member 37 to the loop 24 with the plate 38 overlying the catch piece 36, and with the portion 40 underlying the catch piece 36. The member 37 thus applied has limited pivoting and rocking movement with respect to the loop 24. In other words, the member 37 is loosely connected so as to have a certain amount of free play for reasons to appear.

In order to set the trap when the parts are in the relation shown in Fig. 1, a backward and downward pull is exerted on the plate 38 of the manipulating member 37 with the thumb of one hand while the trap is held with the other hand. When the member 37 is pressed downwardly, the portion 40 encounters and bears down on the rear end portion 28 of the trigger 12. This causes the trigger to rock slightly into a position in which the forward transverse edge of the catch piece 36 is snapped under the projections 31, and is held therein by the reactive force of the tensioned spring 13, with a slight component of such force being exerted on the projections 31 through the loop 24 and the catch piece 36. Since the member 37 is not rigid on the loop 24, it is quite free when the thumb is lifted, and there is no downward pressure remaining on the end portion 28 of the trigger. In this manner the trap is set with the jaw 23 releasably held in its open position, and the bait holding means 27 of the trigger is held elevated as shown in Fig. 2.

The manipulating member 37 having a certain amount of free play eliminates interference with the trigger by the loop after the trap is set. When the thumb is removed from the plate 38 the member 37 is free to move up and off the trigger. Only a very slight effort is required by the animal to spring the trap, because the end portion 28 may move upwardly unimpeded by the loop 24 as the bait-holding end of the trigger is pressed downwardly for disengaging the projections 31 from the catch piece 36.

When the trap is set, the spring 13 is in tension on almost a dead center, and very little effort is required to hold or release the trigger 12. When a mouse nibbling on the bait exerts a slight downward pressure on the trigger 12, the trigger will rock and disengage the projections 31 from the catch piece 36. The spring 13 instantly causes the pivotal movement of the element 11 with the result that the jaw 23 is snapped into its closed position to grippingly cooperate with the jaw 17. In this manner a mouse becomes trapped and is killed. The dead mouse may be removed by raising the jaw 23 in response to pull on the loop 24 as set forth above.

I claim:

1. A trap, including a base, a spring actuated jaw pivoted on said base for movement between a sprung position and a set position, a trigger mounted on said base for pivotal movement, said trigger having a bait holding means on one end and projections thereon near its other end, said projections being disposed between the pivotal axes of the jaw and the trigger, a loop on the jaw, means on the loop engageable with the projections upon pivotal movement of the loop and trigger into set position, and a manipulatable member connected with said means on the loop for limited movement with respect thereto, said manipulatable member having portions which respectively bear on said means on the loop and on one end of the trigger beyond said projections in setting the jaw and trigger with the manipulatable member.

2. A trap as set forth in claim 1, wherein said means on the loop consists of a catch piece of sheet material having an edge which is engageable with said projections.

GEORGE W. OAKES.

References Cited in the file of this patent
UNITED STATES PATENTS

| Number | Name | Date |
|---|---|---|
| 1,830,261 | Bunker | Nov. 3, 1931 |
| 1,919,527 | Orr | July 25, 1933 |
| 2,191,274 | Docken | Feb. 20, 1940 |
| 2,311,178 | Jorgensen | Feb. 16, 1943 |
| 2,577,354 | Oakes | Dec. 4, 1951 |
| 2,560,422 | Horne | July 10, 1951 |

FOREIGN PATENTS

| Number | Country | Date |
|---|---|---|
| 202,081 | Great Britain | Aug. 16, 1923 |